(12) United States Patent (10) Patent No.: US 12,624,663 B2
Van Den Ende et al. (45) Date of Patent: May 12, 2026

(54) AIRCRAFT ENGINE WITH RECUPERATOR AND BYPASS

(71) Applicant: PRATT & WHITNEY CANADA CORP., Longueuil (CA)

(72) Inventors: Daniel Van Den Ende, Mississauga (CA); Dave Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/828,268

(22) Filed: Sep. 9, 2024

(65) Prior Publication Data

US 2026/0071579 A1 Mar. 12, 2026

(51) Int. Cl.
 *F02C 9/18* (2006.01)
 *F02C 7/08* (2006.01)
(52) U.S. Cl.
 CPC ................. *F02C 9/18* (2013.01); *F02C 7/08* (2013.01); *F05D 2220/323* (2013.01); *F05D 2270/053* (2013.01); *F05D 2270/3015* (2013.01); *F05D 2270/309* (2013.01)
(58) Field of Classification Search
 CPC ...... F02C 7/08; F02C 7/10; F02C 9/18; F02C 6/08
 See application file for complete search history.

(56) References Cited

U.S. PATENT DOCUMENTS 3,717,994 A * 2/1973 Templin ................... F02C 7/08
60/39.511
4,179,880 A * 12/1979 Schirmer .................. F23C 7/06
60/39.23

| | | |
|---|---|---|
| 7,775,031 B2 | 8/2010 | Wood |
| 9,068,506 B2 | 6/2015 | Eleftheriou et al. |
| 10,337,401 B2 | 7/2019 | Kupratis et al. |
| 11,428,162 B2 | 8/2022 | Staubach et al. |
| 11,560,846 B2 | 1/2023 | Jones |

(Continued)

FOREIGN PATENT DOCUMENTS

FR 3135111 A1 11/2023

OTHER PUBLICATIONS

European Search Report issued in counterpart EP application No. 25200655.6 on Feb. 2, 2026.

*Primary Examiner* — Thuyhang N Nguyen
(74) *Attorney, Agent, or Firm* — NORTON ROSE FULBRIGHT CANADA LLP

(57) ABSTRACT

An aircraft engine, has: a compressor, a combustor downstream of the compressor, and a turbine; a recuperator having a heat absorption conduit fluidly connecting the compressor to the combustor and a exhaust conduit fluidly connecting the turbine to ambient air surrounding the aircraft engine, the heat absorption conduit in heat exchange relationship with the exhaust conduit; a compressor conduit fluidly connecting the compressor to the heat absorption conduit of the recuperator, the compressor conduit defining a bypass outlet upstream of the recuperator relative to the flow of the compressed air; and a closure at the bypass outlet, the closure having: a closed position in which the closure closes the bypass outlet; and an opened position in which the closure opens the bypass outlet, wherein closure is structured to move from the closed position to the opened position upon a pressure drop through the recuperator exceeding a pressure drop threshold.

20 Claims, 7 Drawing Sheets

(56)                    References Cited

U.S. PATENT DOCUMENTS

| | | | | |
|---|---|---|---|---|
| 2004/0098965 | A1* | 5/2004 | Dettmer | F02C 6/18 |
| | | | | 60/39.511 |
| 2009/0277154 | A1 | 11/2009 | Wood | |
| 2010/0229525 | A1* | 9/2010 | Mackay | F02C 7/08 |
| | | | | 60/39.511 |
| 2010/0275613 | A1* | 11/2010 | Alasti | F02C 6/08 |
| | | | | 60/785 |
| 2011/0138818 | A1* | 6/2011 | Mizukami | F02C 7/08 |
| | | | | 60/39.83 |
| 2011/0146226 | A1 | 6/2011 | Wood | |
| 2013/0318988 | A1 | 12/2013 | Robinson | |
| 2014/0331640 | A1* | 11/2014 | Kurosaka | F02C 9/40 |
| | | | | 60/39.12 |
| 2016/0237894 | A1* | 8/2016 | Kupratis | F02C 3/34 |
| 2017/0292450 | A1* | 10/2017 | Kutnjak | F02C 7/08 |

* cited by examiner

600

602

Transfer heat from the exhaust gases to the compressed air

604

In response to an increase in a power demand at or above a power demand threshold, flowing the compressed air from the compressor to the combustor while bypassing the recuperator.

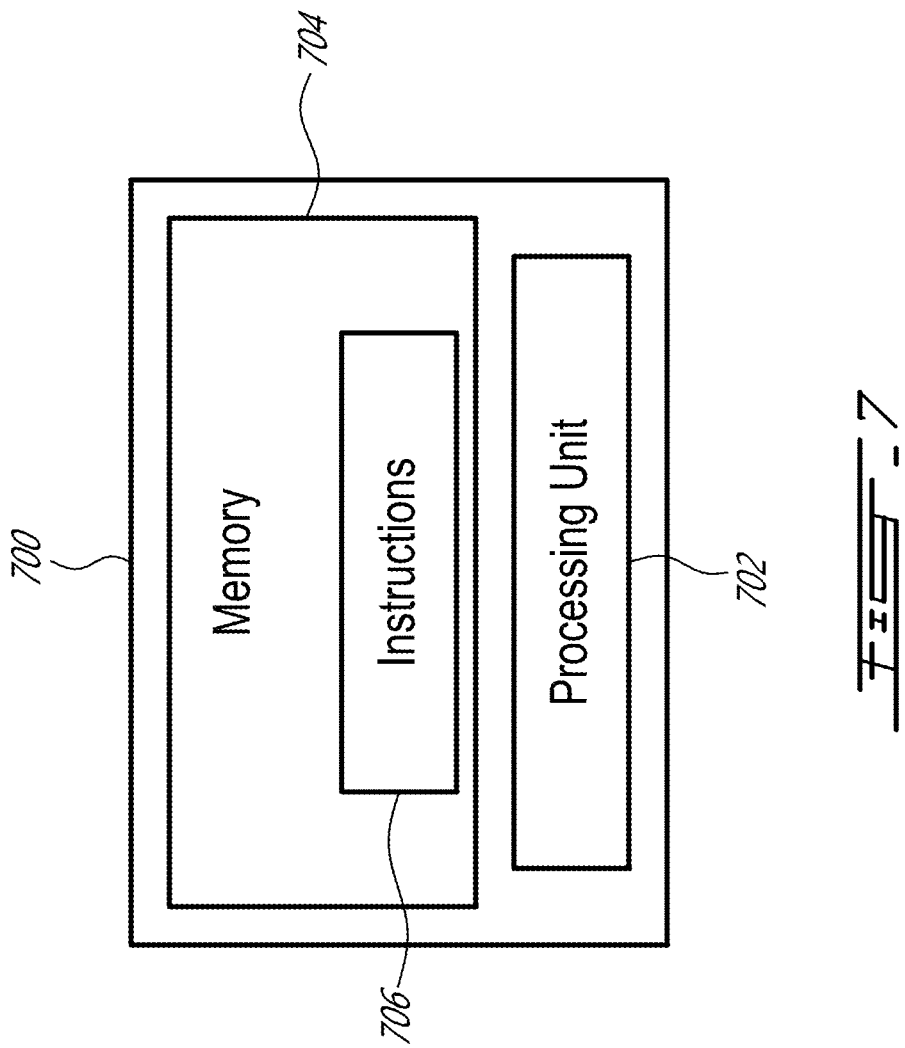
_FIL_-7

AIRCRAFT ENGINE WITH RECUPERATOR AND BYPASS

TECHNICAL FIELD

The application relates generally to aircraft engines and, more particularly, to recuperators used in such engines.

BACKGROUND

Aircraft engines may include recuperators to transfer heat from combustion gases to compressed air before the compressed air is fed to a combustor. Preheating the compressed air may improve fuel efficiency of the engine in a number of ways. Aircraft engines with recuperators may be suitable for their intended purposes, but there remains a need for improvement.

SUMMARY

In one aspect, there is provided an aircraft engine, comprising: a compressor, a combustor fluidly downstream of the compressor relative to a flow of compressed air through the aircraft engine, and a turbine fluidly downstream of the combustor; a recuperator having a heat absorption conduit fluidly connecting the compressor to the combustor and a exhaust conduit fluidly connecting the turbine to ambient air surrounding the aircraft engine, the heat absorption conduit in heat exchange relationship with the exhaust conduit; a compressor conduit fluidly connecting the compressor to the heat absorption conduit of the recuperator, the compressor conduit defining a bypass outlet upstream of the recuperator relative to the flow of the compressed air; and a closure at the bypass outlet, the closure having: a closed position in which the closure closes the bypass outlet; and an opened position in which the closure opens the bypass outlet, wherein the closure is structured to move from the closed position to the opened position upon a pressure drop through the recuperator exceeding a pressure drop threshold.

The aircraft engine described above may include any of the following features, in any combinations.

In some embodiments, the closure is structured to move from the closed position to the opened position upon the pressure drop through the recuperator exceeding the pressure drop threshold by being made of a material having a stiffness selected to allow gasses acting on the passive closure to deflect the closure from the closed position toward the opened position upon the pressure drop through the recuperator exceeding the pressure drop threshold.

In some embodiments, the closure is structured to move from the closed position to the opened position upon the pressure drop through the recuperator exceeding the pressure drop threshold by: being operatively connected to an actuator, the actuator being operatively connected to a controller, the controller being operatively connected to a sensor sensing a pressure drop through the recuperator and generating a signal received by the controller and being indicative of the pressure drop, and the controller being programmed to determine when the pressure drop through the recuperator exceeds the pressure drop threshold, and in response to determining that the pressure drop through the recuperator exceeds the pressure drop threshold, operate the actuator to move the closure from the closed position to the opened position.

In some embodiments, the closure is an annular wall annularly extending around a central axis of the aircraft engine.

In some embodiments, the annular wall extends circumferentially around the combustor, the annular wall axially overlapping the combustor.

In some embodiments, the annular wall extends from a base to a tip, the annular wall being cantilevered from the base.

In some embodiments, in the closed position, the tip of the annular wall abuts a flange defined by the compressor conduit at the bypass outlet.

In some embodiments, in the opened position, the annular wall defines a plurality of convolutions circumferentially distributed bout the central axis.

In some embodiments, the annular wall is sheet metal having a thickness selected to permit a creation of the plurality of convolutions.

In some embodiments, a second compressor conduit is fluidly connecting an outlet of the heat absorption conduit of the recuperator to the combustor, the closure defining a portion of both of the compressor conduit and the heat absorption conduit.

In some embodiments, in the opened position, the compressor conduit is fluidly connected to the exhaust conduit via the bypass outlet.

In some embodiments, the closure defines a portion of both of the second compressor conduit and the compressor conduit.

In another aspect, there is provided a method of mitigating pressure loss through a recuperator facilitating heat exchange between exhaust gases exiting a combustor and compressed air exiting a compressor of an aircraft engine, comprising: transferring heat from the exhaust gases to the compressed air; and in response to an increase in a power demand at or above a power demand threshold, flowing the compressed air from the compressor to the combustor while bypassing the recuperator.

The method described above may include any of the following features, in any combinations.

In some embodiments, the bypassing the recuperator includes flowing the compressed air through a bypass outlet of a compressor conduit fluidly connecting the compressor to the recuperator.

In some embodiments, the flowing of the compressed air through the bypass outlet includes moving an annular wall from a closed position to an open position.

In some embodiments, the moving of the annular wall includes moving the annular wall when a pressure drop through the recuperator is above a pressure drop threshold.

In some embodiments, the moving of the annular wall from the closed position to the open position includes deforming the annular wall until the annular wall defines convolutions distributed around a central axis of the aircraft engine.

In some embodiments, the bypassing the recuperator includes flowing the compressed air around a tip of the annular wall from the compressor conduit fluidly connecting the compressor to the recuperator to a plenum containing the combustor.

In some embodiments, the flowing of the compressed air through the bypass outlet includes moving a bypass closure with an actuator upon detecting that a pressure drop through the recuperator is above a pressure drop threshold.

In some embodiments, flowing the compressed air while bypassing the recuperator includes opening a bypass closure upon one of: receiving a signal indicative of the power demand being above the power demand threshold; receiving a signal indicative that a throttle lever is moved at an angular speed being above a speed threshold; and receiving a signal from a cockpit switch, the signal indicative that the recuperator is to be bypassed.

DESCRIPTION OF THE DRAWINGS

Reference is now made to the accompanying figures in which:

FIG. 7 is a schematic representation of a controller.

DETAILED DESCRIPTION

Figure 1:
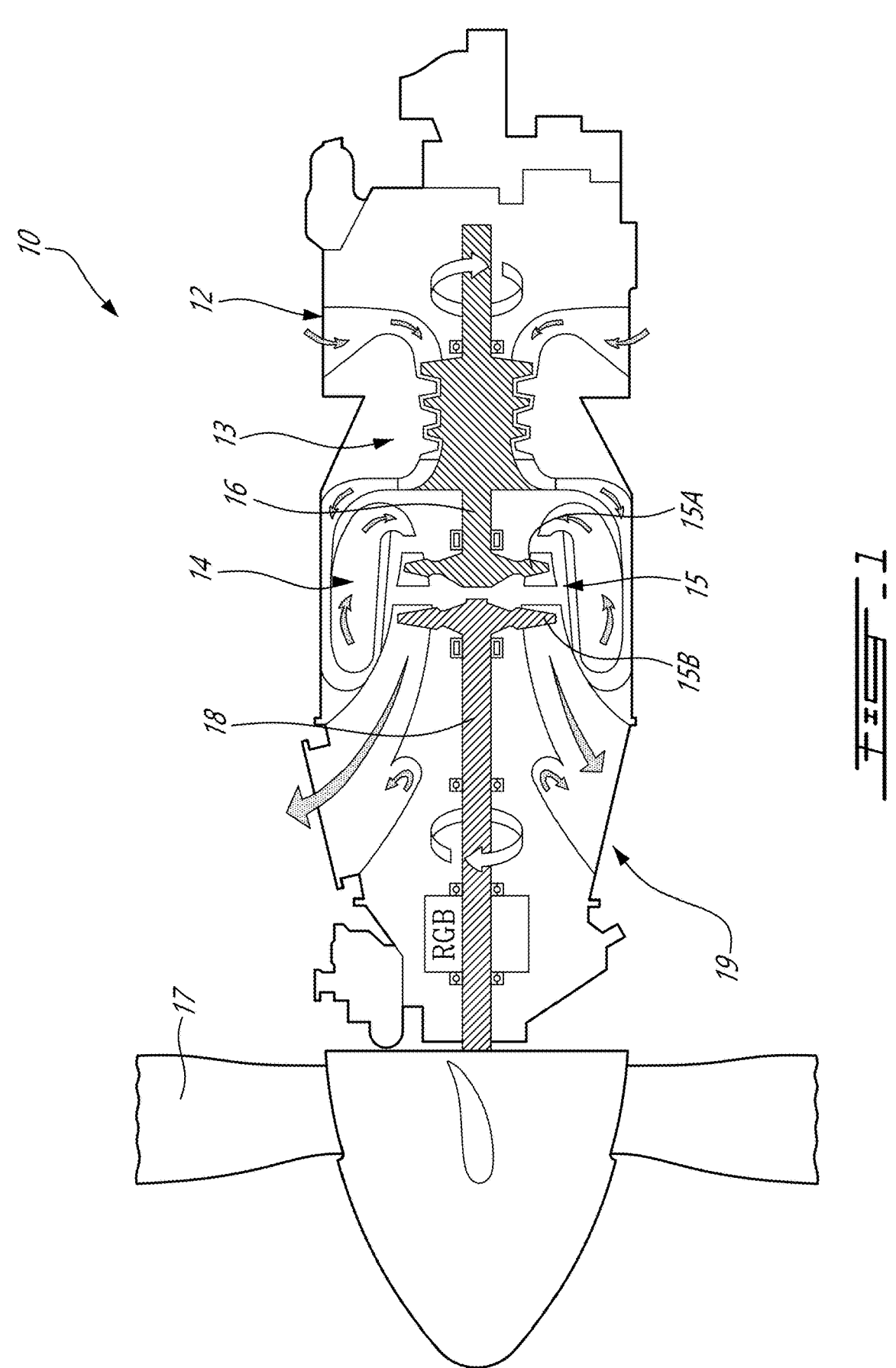
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication an inlet 12 for receiving air, a compressor section 13 for compressing the air received via the inlet 12, a combustor 14 for mixing fuel with the compressed air and for generating an annular stream of combustion gases. A turbine section 15 receiving the combustion gases from the combustor 14. The compressor section 13, the combustor 14, and the turbine section 15 may be considered as a core of the gas turbine engine 10. The turbine section 15 has a high-pressure turbine 15A drivingly engaged to the compressor section 13 via a high-pressure shaft 16. The turbine section 15 further has a power or low-pressure turbine 15B downstream of the high-pressure turbine 15A and drivingly engaged to a propeller 17 via a low-pressure shaft 18. The low-pressure shaft 18 may be directly engaged to the propeller 17 or, as shown herein, drivingly engaged to the propeller 17 via a reduction gearbox RGB. The gas turbine engine 10 has an exhaust 19 for expelling the combustion gases. Although the depicted gas turbine engine 10 is a turboprop engine, the present disclosure may apply to other engines, such as turboshaft engines and to auxiliary power units (APU). In an alternate embodiment, the compressor section may include a high-pressure compressor drivingly engaged to the high-pressure turbine 15A via the high-pressure shaft 16 and a low-pressure compressor drivingly engaged to the low-pressure turbine 15B via the low-pressure shaft 18.

Figure 2:
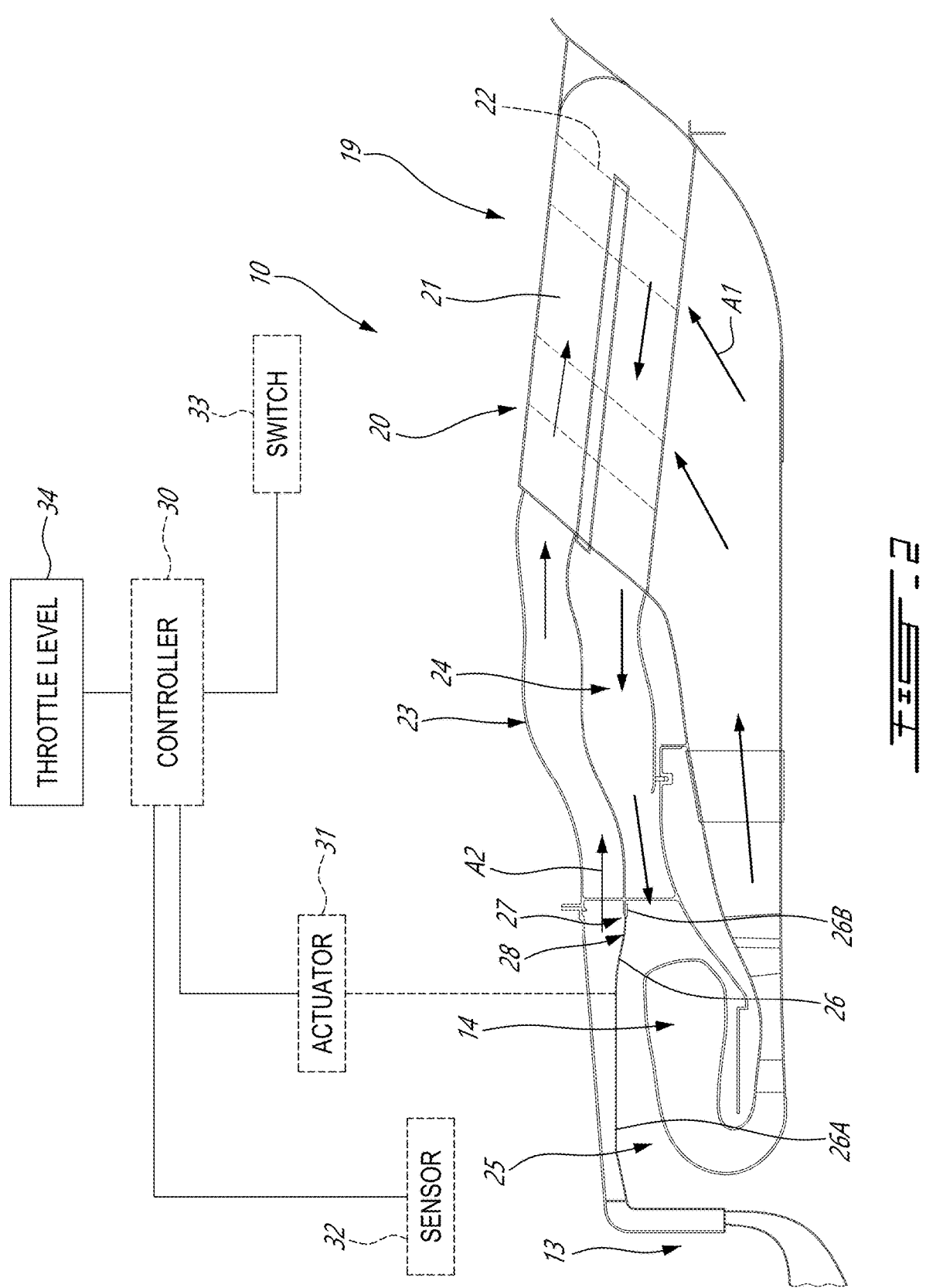
FIG. 2 is an enlarged view of a portion of FIG. 1 illustrating a combustor and a recuperator of the gas turbine engine of FIG. 1.

Referring now to FIG. 2, an enlarged view of a portion of the gas turbine engine 10 of FIG. 1 is illustrated.

In the embodiment shown, the gas turbine engine 10 includes a recuperator 20 for facilitating heat exchange between exhaust gases exiting the turbine section 15 along arrows A1 and compressed air exiting the compressor section 13 along arrows A2. The recuperator 20 may be located across the exhaust 19 of the gas turbine engine 10. More specifically, the recuperator 20 may be located within an exhaust conduit that fluidly connects an outlet of the turbine section 15 to an environment outside the gas turbine engine 10. The recuperator 20 may have an annular structure extending fully around a central axis of the gas turbine engine 10.

The recuperator 20 has a heat absorption conduit 21 fluidly connecting an outlet of the compressor section 13 to the combustor 14 and an exhaust conduit 22 fluidly connecting an outlet of the turbine section 15 to the environment outside the gas turbine engine 10. The heat absorption conduit 21 is in heat exchange relationship with the exhaust conduit 22. As shown in FIG. 2, the heat absorption conduit 21 defines a U-shape in that the compressed air flows in a first axial direction before meeting an elbow to change direction in a second axial direction opposite the first axial direction. The exhaust conduit 22 extends around the heat absorption conduit 21. It will be appreciated that the heat absorption conduit 21 and the exhaust conduit 22 may each include a plurality of conduits distributed circumferentially, radially, and/or axially relative to the central axis of the gas turbine engine 10. When the compressed air flows into the heat absorption conduit 21, it picks up heat transmitted by the exhaust gases flowing in the exhaust conduit 22. This increases a temperature of the compressed air before said air is fed to the combustor 14. Efficiency may be obtained with the recuperator 20.

Still referring to FIG. 2, in this configuration, a first compressed air conduit 23, also referred to as a compressor conduit, fluidly connects the outlet of the compressor section 13 to the heat absorption conduit 21 of the recuperator 20 and a second compressed air conduit 24, or second compressor conduit, fluidly connects an outlet of the heat absorption conduit 21 of the recuperator 20 to the combustor 14, more specifically, to a plenum 25 that contains the combustor 14. In some embodiments, the first compressed air conduit 23 and the second compressed air conduit 24 share an annular wall 26. This annular wall 26 is exposed to cold compressed air on its outer side and to hot compressed air on its inner side.

Although the recuperator 20 may increase efficiency of the gas turbine engine 10 in some operating conditions, there are some situations in which the recuperator 20 may be undesired. For instance, for a helicopter having two of the gas turbine engines 10 of FIG. 1, if one becomes inoperative, the other must provide more power to compensate for the loss. In such a case, it may be desired to avoid the compressed air from flowing through the recuperator 20 to minimize pressure loss and to maximize a power output of the remaining engine. In other words, at increased power conditions, the flow rate of the compressed air may be limited by the recuperator 20. This may be explained by the pressure drop through the recuperator 20 becoming more significant with an increase of power of the engine since more air flows through the recuperator 20. A power achievable by the engine may thus be limited by the recuperator 20.

Thus, in some embodiments, the first compressed air conduit 23 defines a bypass outlet 27 located upstream of the recuperator 20 relative to a flow of compressed air flowing into the heat absorption conduit 21 of the recuperator 20. The gas turbine engine 10 includes a closure, also referred to as a movable member, 28 at the bypass outlet 27, the closure 28 has: a closed position in which the closure 28 closes the bypass outlet 27 and in which the outlet of the compressors section 13 is fluidly connected to the combustor 14 through the recuperator 20; and an opened position in which the closure 28 is offset from the bypass outlet 27 and in which the outlet of the compressor section 13 is fluidly connected to the combustor 14 while bypassing the recuperator 20 through the bypass outlet 27.

In some embodiments, the closure 28 corresponds to the annular wall 26 that is resiliently deformable between the open and closed positions. In this embodiment, the annular wall 26 extends circumferentially around the combustor 14 and axially overlaps the combustor 14. Alternatively, the closure 28 may be located anywhere from an outlet of the compressor section 13 to an inlet of the recuperator 20. The annular wall 26 extends from a base 26A to a tip 26B. The annular wall 26 may be cantilevered from the base 26A.

Figure 3:
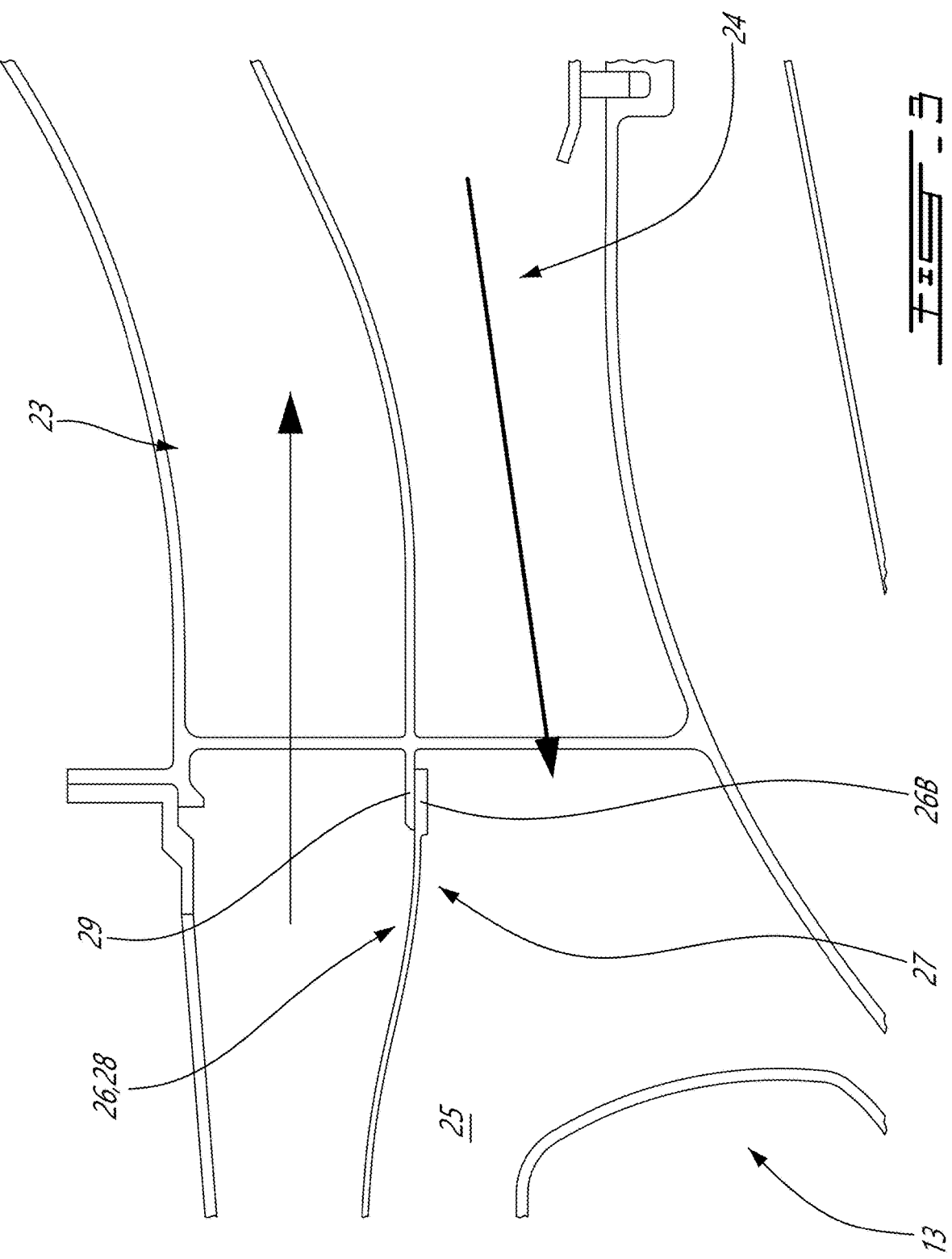
FIG. 3 is an enlarged portion of FIG. 2 illustrating a closure in a closed position.

Referring more particularly to FIG. 3, in the closed position, the tip 26B of the annular wall 26 abuts a flange 29 of the first compressed air conduit 23; the flange 29 being located at the bypass outlet 27. This abutment seals the bypass outlet 27 thereby forcing the compressed air flowing in the first compressed air conduit 23 to flow through the recuperator 20.

Figure 4:
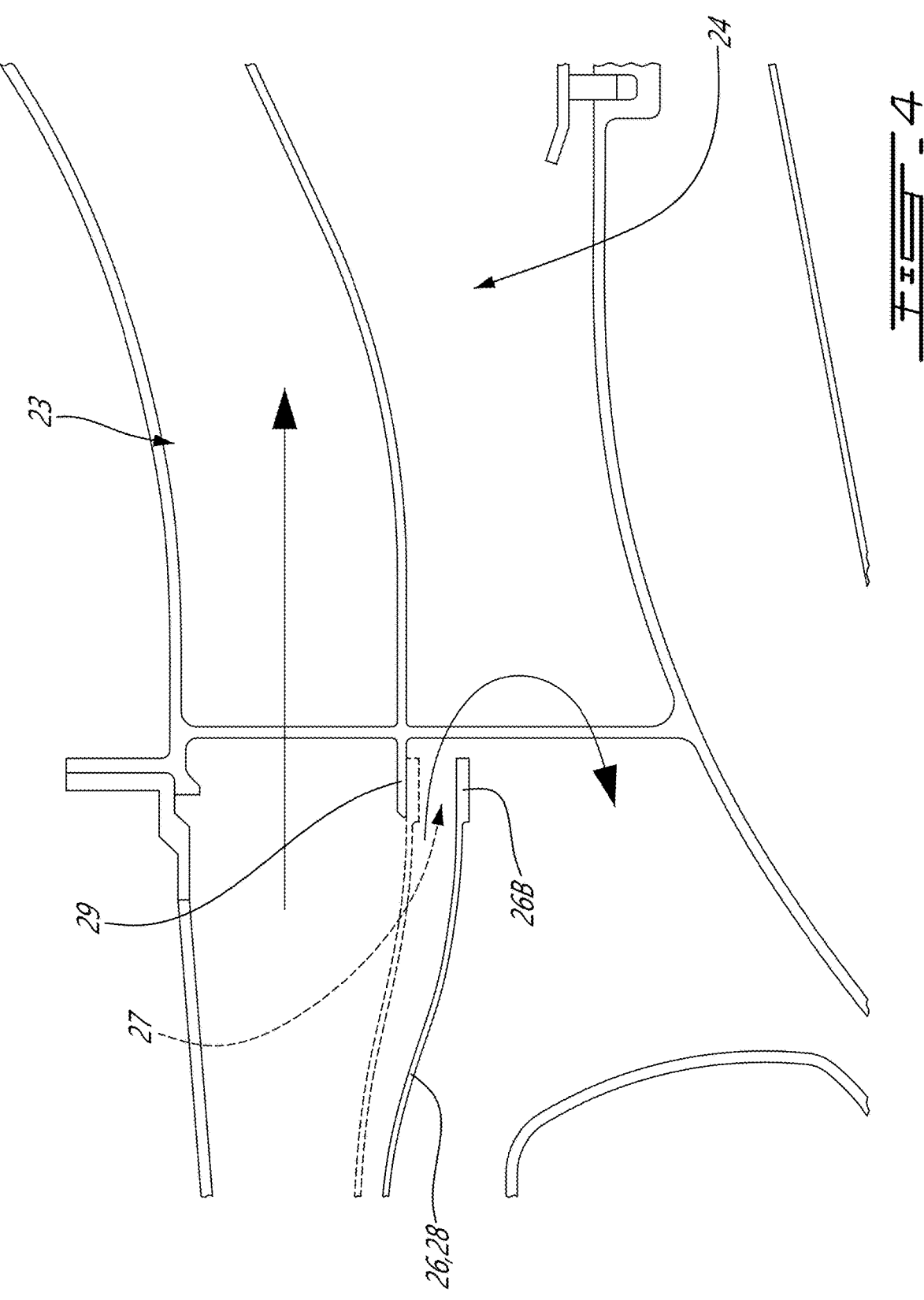
FIG. 4 is an enlarged portion of FIG. 2 illustrating the closure in an opened position.
Figure 5:
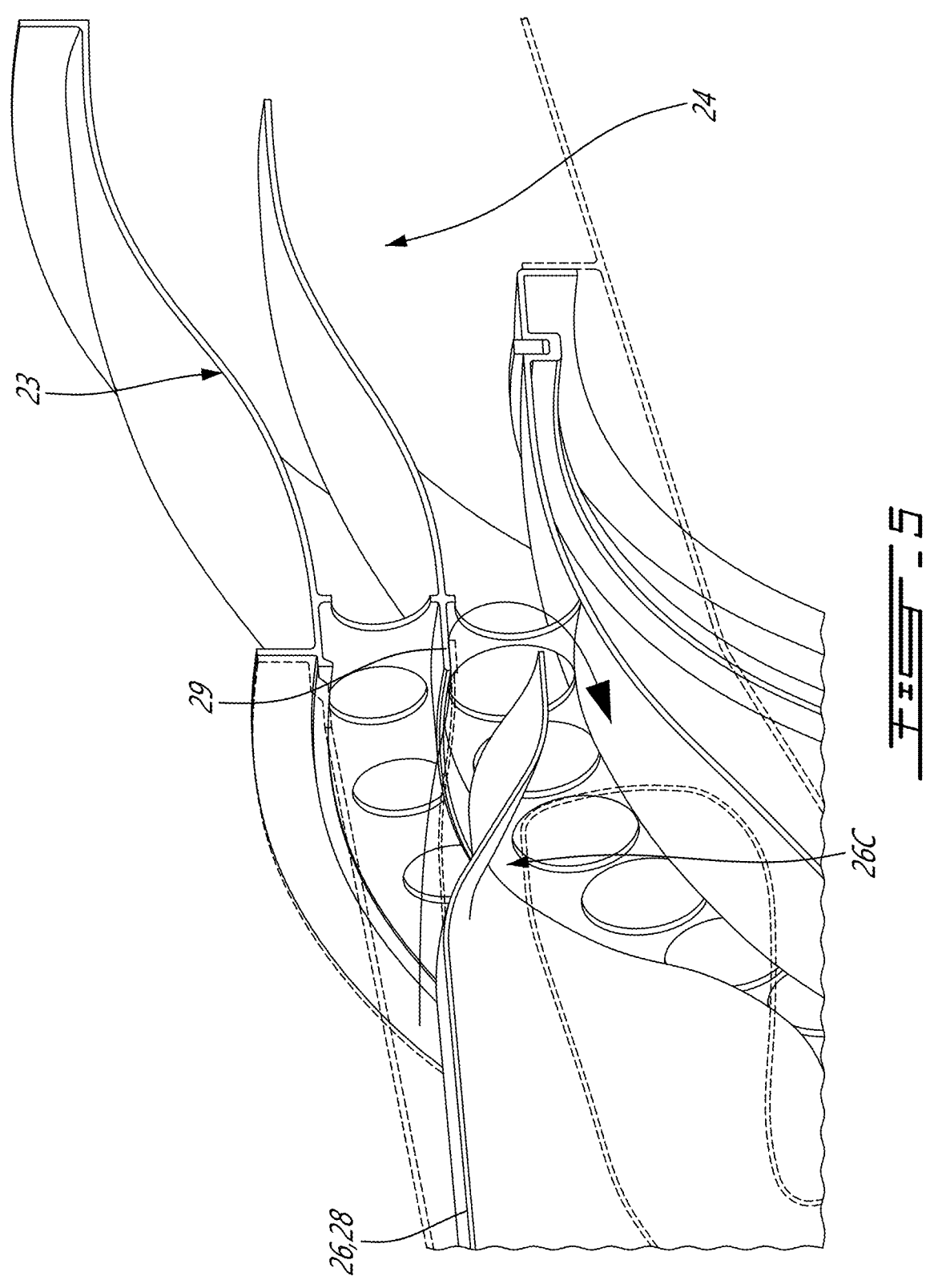
FIG. 5 is a three-dimensional cutaway view illustrating the closure in the opened position.

Referring to FIGS. 4-5, in the open position, at least a portion of a periphery of the tip 26B of the annular wall 26 becomes offset from the flange 29 thereby opening the bypass outlet 27. This effectively allows the compressed air flowing in the first compressed air conduit 23 to flow directly into the second compressed air conduit 24 and into the combustor 14 while bypassing the recuperator 20. As shown in FIG. 5, in the opened position, the annular wall 26 defines a plurality of convolutions 26C circumferentially distributed about the central axis of the gas turbine engine 10. The convolutions 26C include crests and valleys circumferentially alternating. Therefore, the annular wall 26 may be sheet metal that deforms into a convoluted shape to permit the opening of the bypass outlet 27 at a plurality of locations circumferentially distributed around the central axis. More specifically, the sheet metal has a thickness selected to permit a creation of the plurality of convolutions 26C.

In this embodiment, a stiffness of the closure 28 is selected such that the closure 28, herein the annular wall 26, moves from the closed position to the opened position upon a pressure drop through the recuperator 20 reaching a pressure drop threshold. In other words, as the air flow within the engine increases with power, the pressure drop across the recuperator 20 similarly increases and, at a design point, the annular wall 26 may flex offering a bypass direct from the compressor section 13 to the combustor 14 allowing high power condition. As the engine returns to reduced power condition, the annular wall 26 may restore the seal allowing more efficient operation. Put differently, the deformation of the annular wall 26 is elastic in that the annular wall 26 reverts to its undeformed shape, corresponding to the closed position, when the pressure in the first compressed air conduit 23 falls below the pressure threshold.

The pressure drop may reach the pressure drop threshold when the aircraft engine is being operated at a power level above a power level threshold, which may be above a take-off power level. In some embodiments, the power level triggering the opening of the closure 28 may be at least 20% above a take-off power level. In some embodiments, the power level triggering the opening of the closure 28 may be at least 80%, preferably at least 90% of a maximum power level of the aircraft engine. Such situations may arise, for instance, if one of a two-engine aircraft is becoming non-operational, if the pilot is trying to avoid an obstacle, or other emergency situations. In such cases, efficiency is of lesser importance compared to power and it may be desired to bypass the recuperator 20 to generate as much power as possible even at the expense of a reduction in efficiency.

It will be appreciated that any means for selectively fluidly connecting the compressor section 13 directly to the combustor 14 while bypassing the recuperator 20 may be used. These means may include, for instance, a flap covering an aperture defined through a wall of the first compressed air conduit 23. The flap may be engaged by a biasing member, such as a spring, configured to allow the flap to pivot from a closed position to an opened position when the pressure inside the first compressed air conduit reaches a pressure drop threshold. The means may include a door engaged to an actuator, the actuator operatively connected to a controller having a processing unit and computer-readable medium operatively connected to the processing unit and having instructions stored thereon to receive a signal indicative that the gas turbine engine 10 is to be operated in a higher power mode and cause the powering of the actuator to open the bypass outlet 27 by moving the door.

Referring back to FIG. 2, in some embodiments, a controller 30 of the gas turbine engine 10 may be used to cause the opening and closing of the closure 28. An actuator 31 may be engaged to the closure 28 and operatively connected to the controller 30. A sensor 32 may be operatively connected to the first compressed air conduit 23 and configured to generate a signal indicative of a pressure drop through the recuperator 20. The sensor 32 may be a pressure differential sensor exposed to both of the first compressed air conduit 23 and to the second compressed air conduit 24, a flow rate sensor, and any sensor whose signal may indicate that the gas turbine engine 10 is used at a power level necessitating a reduction of the pressure loss through the recuperator 20. The controller 30 may thus be configured to determine that the pressure drop through the recuperator 20 is above the pressure drop threshold based on the signal received form the sensor 32; and cause the actuator 31 to move the closure 28 from the closed position to the opened position. In some embodiments, a cockpit switch 33, which may be located in a cockpit of an aircraft equipped with the gas turbine engine 10, may be operatively connected to the controller 30 and configured to send a signal to the controller 30 to cause the actuator 31 to move the closure 28 from the closed configuration to the opened configuration. In an alternate embodiment, a throttle lever 34 is operatively connected to the controller 30 and used to vary a power generated by the aircraft engine. The throttle lever 34 may send a signal to the controller 30 indicative that the throttle lever is moved at an angular speed being above a speed threshold. When this condition is met, the closure 28 may be opened to bypass the recuperator 20. A rapid movement of the throttle lever may indicate that a pilot is requiring a rapid increase in power that may necessitate bypassing the recuperator 20. Such a situation may arise, for instance, if the pilot is trying to avoid an obstacle. To provide all the power available, it may be desired to minimize the pressure drop through the recuperator 20 as much as possible. The controller 30 may be configured to automatically trigger the bypassing of the recuperator by opening the closure when the angular speed of the throttle lever 34 exceeds the speed threshold. Hence, it may be beneficial to bypass the recuperator 20 in these situations. The cockpit switch 33 may have the same purpose, but is activated manually by the pilot.

Figure 6:
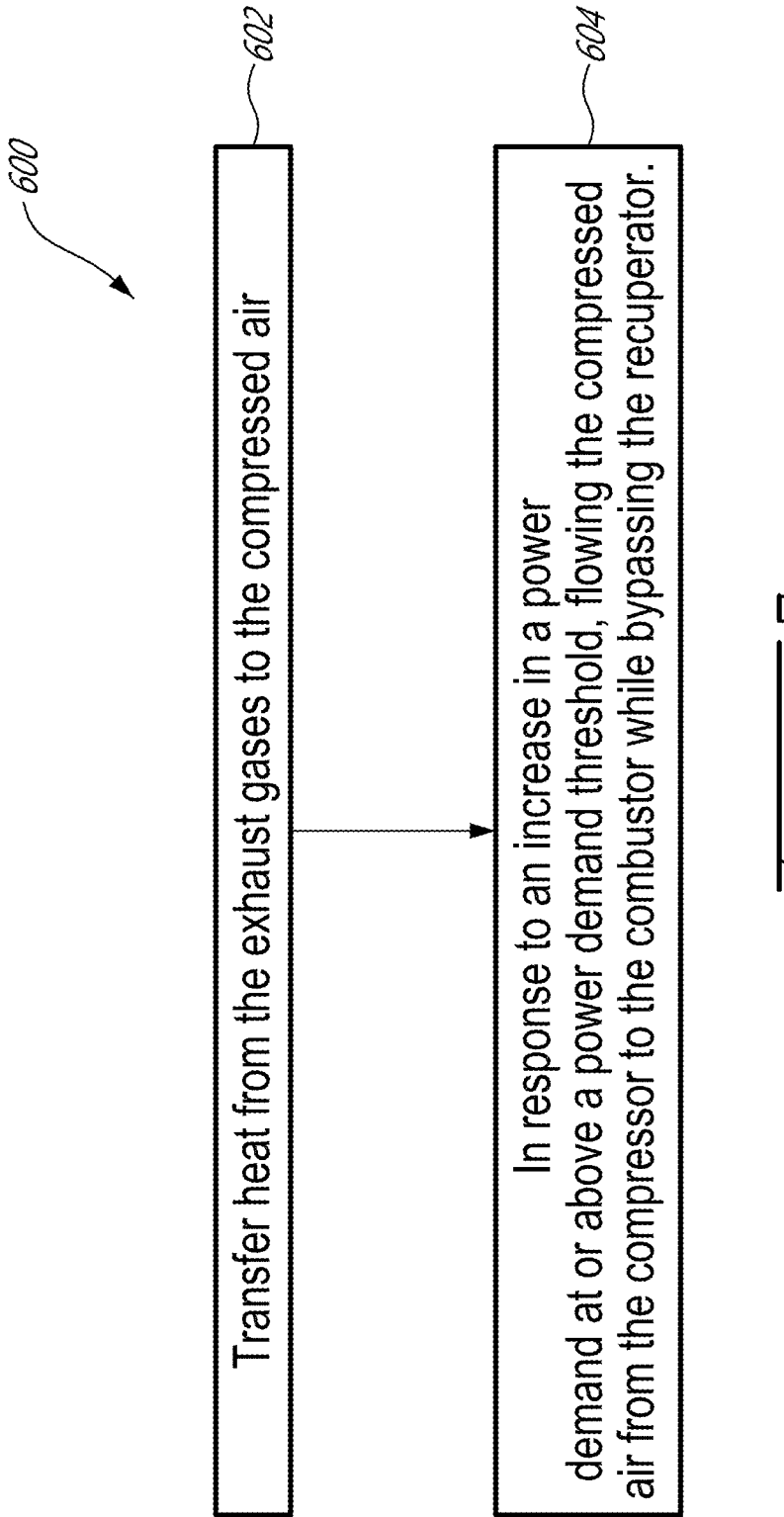
FIG. 6 is a flowchart illustrating steps of a method of mitigating pressure loss through the recuperator.

Referring now to FIG. 6, a method of mitigating pressure loss through the recuperator 20 is shown at 600. The method 600 includes transferring heat from the exhaust gases to the compressed air at 602; and upon the aircraft engine being subjected to an increase in a power demand at or above a power demand threshold, flowing the compressed air from the compressor section 13 to the combustor 14 while bypassing the recuperator 20 at 604.

In some embodiments, the bypassing of the recuperator at 604 includes flowing the compressed air through the bypass outlet 27 of the second compressed air conduit 24 fluidly connecting the compressor 13 to the recuperator 20. This includes moving the annular wall 26 from the closed position to the open position. The moving of the annular wall 26 may include moving the annular wall 26 when the pressure drop through the recuperator 20 is above a pressure drop threshold. The moving of the annular wall 26 from the closed position to the open position may include deforming the annular wall 26 until the annular wall 26 defines the convolutions 26C distributed around the central axis.

In some embodiments, the bypassing the recuperator 20 includes flowing the compressed air around the tip 26B of the annular wall 26 from the first compressed air conduit 23 fluidly connecting the compressor 13 to the recuperator 20 to the plenum 25 containing the combustor 14.

In some embodiments, the flowing of the compressed air through the bypass outlet 27 includes moving the closure 28 with the actuator 31 upon detecting that the pressure drop through the recuperator is above a pressure drop threshold. The method may include opening the closure 28 upon one of: receiving a signal indicative of the power demand being above the power demand threshold; receiving a signal indicative that the throttle lever 34 is moved at an angular speed being above a speed threshold; and receiving a signal from the cockpit switch 33, the signal indicative that the recuperator is to be bypassed.

With reference to FIG. 7, an example of a computing device 700 is illustrated. For simplicity only one computing device is shown but the system may include more computing devices 700 operable to exchange data. The computing devices 700 may be the same or different types of devices. The controller 30 may be implemented with one or more computing devices 700. Note that the controller 30 can be implemented as part of a full-authority digital engine controls (FADEC) or other similar device, including electronic engine control (EEC), engine control unit (ECU), electronic propeller control, propeller control unit, and the like. In some embodiments, the controller 30 is implemented as a Flight Data Acquisition Storage and Transmission system, such as a FAST™ system. The controller 30 may be implemented in part in the FAST™ system and in part in the EEC. Other embodiments may also apply.

The computing device 700 comprises a processing unit 702 and a memory 704 which has stored therein computer-executable instructions 706. The processing unit 702 may comprise any suitable devices configured to implement the method described herein such that instructions 706, when executed by the computing device 700 or other programmable apparatus, may cause the functions/acts/steps performed as part of the method as described herein to be executed. The processing unit 702 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 704 may comprise any suitable known or other machine-readable storage medium. The memory 704 may comprise non-transitory computer readable storage medium, for example, but not limited to, an electronic, magnetic, optical, electromagnetic, infrared, or semiconductor system, apparatus, or device, or any suitable combination of the foregoing. The memory 704 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 704 may comprise any storage means (e.g., devices) suitable for retrievably storing machine-readable instructions 706 executable by processing unit 702.

The methods and systems described herein may be implemented in a high level procedural or object oriented programming or scripting language, or a combination thereof, to communicate with or assist in the operation of a computer system, for example the computing device 700. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 702 of the computing device 700, to operate in a specific and pre-defined manner to perform the functions described herein, for example those described in the method 600.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
   a compressor, a combustor fluidly downstream of the compressor relative to a flow of compressed air through the aircraft engine, and a turbine fluidly downstream of the combustor;
   a recuperator having a heat absorption conduit fluidly connecting the compressor to the combustor and an exhaust conduit fluidly connecting the turbine to ambient air surrounding the aircraft engine, the heat absorption conduit in heat exchange relationship with the exhaust conduit;
   a compressor conduit fluidly connecting the compressor to the heat absorption conduit of the recuperator, the compressor conduit defining a bypass outlet upstream of the recuperator relative to the flow of the compressed air;
   a closure at the bypass outlet, the closure having a closed position in which the closure closes the bypass outlet, and an opened position in which the closure opens the bypass outlet;
   an actuator operatively connected to the closure;
   a sensor sensing a pressure drop through the recuperator and generating a signal being indicative of the pressure drop; and
   a controller operatively connected to the sensor and to the actuator, the controller being programmed to:
      determine when the pressure drop through the recuperator exceeds a pressure drop threshold from the signal from the sensor, and
      in response to determining that the pressure drop through the recuperator exceeds the pressure drop threshold, operate the actuator to move the closure from the position to the opened position.

2. The aircraft engine of claim 1, wherein the closure is an annular wall annularly extending around a central axis of the aircraft engine.

3. The aircraft engine of claim 2, wherein the annular wall extends circumferentially around the combustor, the annular wall axially overlapping the combustor.

4. The aircraft engine of claim 2, wherein the annular wall extends from a base to a tip, the annular wall being cantilevered from the base.

5. The aircraft engine of claim 4, wherein, in the closed position, the tip of the annular wall abuts a flange defined by the compressor conduit at the bypass outlet.

6. The aircraft engine of claim 5, wherein, in the opened position, the annular wall defines a plurality of convolutions circumferentially distributed about the central axis.

7. The aircraft engine of claim 6, wherein the annular wall is sheet metal having a thickness selected to permit a creation of the plurality of convolutions.

8. The aircraft engine of claim 1, comprising a second compressor conduit fluidly connecting an outlet of the heat absorption conduit of the recuperator to the combustor, the closure defining a portion of both of the compressor conduit and the heat absorption conduit.

9. The aircraft engine of claim 8, wherein, in the opened position, the compressor conduit is fluidly connected to the exhaust conduit via the bypass outlet.

10. The aircraft engine of claim 8, wherein the closure defines a portion of both of the second compressor conduit and the compressor conduit.

11. A method of mitigating pressure loss through a recuperator facilitating heat exchange between exhaust gases exiting a combustor and compressed air exiting a compressor of an aircraft engine, comprising:

transferring heat from the exhaust gases to the compressed air; and in response to an increase in a power demand at or above a power demand threshold, flowing the compressed air from the compressor to the combustor while bypassing the recuperator, including flowing the compressed air through a bypass outlet of a compressor conduit fluidly connecting the compressor to the recuperator by moving an annular wall from a closed position to an open position.

12. The method of claim 11, wherein the moving of the annular wall includes moving the annular wall when a pressure drop through the recuperator is above a pressure drop threshold.

13. The method of claim 12, wherein the moving of the annular wall from the closed position to the open position includes deforming the annular wall until the annular wall defines convolutions distributed around a central axis of the aircraft engine.

14. The method of claim 12, wherein the bypassing the recuperator includes flowing the compressed air around a tip of the annular wall from the compressor conduit fluidly connecting the compressor to the recuperator to a plenum containing the combustor.

15. The method of claim 11, wherein the flowing of the compressed air through the bypass outlet includes moving a bypass closure with an actuator upon detecting that a pressure drop through the recuperator is above a pressure drop threshold.

16. The method of claim 11, wherein flowing the compressed air while bypassing the recuperator includes opening a bypass closure upon one of:

receiving a signal indicative of the power demand being above the power demand threshold;

receiving a signal indicative that a throttle lever is moved at an angular speed being above a speed threshold; and receiving a signal from a cockpit switch, the signal indicative that the recuperator is to be bypassed.

17. An aircraft engine, comprising:

a compressor, a combustor fluidly downstream of the compressor relative to a flow of compressed air through the aircraft engine, and a turbine fluidly downstream of the combustor;

a recuperator having a heat absorption conduit fluidly connecting the compressor to the combustor and an exhaust conduit fluidly connecting the turbine to ambient air surrounding the aircraft engine, the heat absorption conduit in heat exchange relationship with the exhaust conduit;

a compressor conduit fluidly connecting the compressor to the heat absorption conduit of the recuperator, the compressor conduit defining a bypass outlet upstream of the recuperator relative to the flow of the compressed air; and a closure at the bypass outlet, the closure being an annular wall annularly extending around a central axis of the aircraft engine, the annular wall extending from a base to a tip, the annular wall being cantilevered from the base, the closure having:

a closed position in which the closure closes the bypass outlet; and an opened position in which the closure opens the bypass outlet, wherein the closure is structured to move from the closed position to the opened position upon a pressure drop through the recuperator exceeding a pressure drop threshold.

18. The aircraft engine of claim 17, wherein the closure is structured to move from the closed position to the opened position upon the pressure drop through the recuperator exceeding the pressure drop threshold by being made of a material having a stiffness selected to allow gasses acting on the passive closure to deflect the closure from the closed position toward the opened position upon the pressure drop through the recuperator exceeding the pressure drop threshold.

19. The aircraft engine of claim 17, wherein, in the closed position, the tip of the annular wall abuts a flange defined by the compressor conduit at the bypass outlet.

20. The aircraft engine of claim 17, wherein, in the opened position, the annular wall defines a plurality of convolutions circumferentially distributed bout about the central axis.

* * * * *